(12) United States Patent
Mengle et al.

(10) Patent No.: US 9,792,371 B1
(45) Date of Patent: Oct. 17, 2017

(54) AUTOMATIC SYNTHESIS AND EVALUATION OF CONTENT

(71) Applicant: Google Inc., Mountain View, CA (US)

(72) Inventors: Advay Mengle, Sunnyvale, CA (US); Venky Ramachandran, Cupertino, CA (US); Shreyas Doshi, Mountain View, CA (US); Gaurav Garg, San Francisco, CA (US); Luke Hiro Swartz, San Francisco, CA (US)

(73) Assignee: Google Inc., Mountain View, CA (US)

( * ) Notice: Subject to any disclaimer, the term of this patent is extended or adjusted under 35 U.S.C. 154(b) by 576 days.

(21) Appl. No.: 13/921,742

(22) Filed: Jun. 19, 2013

(51) Int. Cl.
*G06F 17/30* (2006.01)
*G06Q 30/02* (2012.01)

(52) U.S. Cl.
CPC .............. *G06F 17/30867* (2013.01)

(58) Field of Classification Search
CPC ............... G06F 17/30864; G06F 17/30867
USPC ........................................... 707/728
See application file for complete search history.

(56) References Cited

U.S. PATENT DOCUMENTS

| | | | |
|---|---|---|---|
| 7,464,003 B2 | 12/2008 | Pomplun | |
| 7,827,060 B2 * | 11/2010 | Wright ................. | G06Q 30/02 705/14.4 |
| 2008/0040318 A1 * | 2/2008 | Stanis ................... | G06Q 30/02 |
| 2008/0052043 A1 | 2/2008 | Pomplun | |
| 2008/0270223 A1 * | 10/2008 | Collins ................ | G06Q 30/02 705/14.42 |
| 2009/0055725 A1 * | 2/2009 | Portnov ................ | G06Q 30/02 715/234 |
| 2009/0076777 A1 | 3/2009 | Pomplun | |
| 2009/0138356 A1 | 5/2009 | Pomplun | |
| 2010/0017286 A1 * | 1/2010 | Coles ..................... | G06Q 30/02 705/14.43 |
| 2010/0082441 A1 * | 4/2010 | Doemling ............. | G06Q 30/02 705/14.72 |
| 2010/0100442 A1 * | 4/2010 | Gorsline ............... | G06Q 30/02 705/14.53 |
| 2010/0114698 A1 | 5/2010 | Goel et al. | |
| 2013/0124318 A1 * | 5/2013 | Park ....................... | G06Q 30/02 705/14.54 |

(Continued)

*Primary Examiner* — Hosain Alam
*Assistant Examiner* — Robert F May
(74) *Attorney, Agent, or Firm* — Fish & Richardson P.C.

(57) ABSTRACT

Methods, systems, and apparatus include computer programs encoded on a computer-readable storage medium, including a system that includes a synthesis subsystem that automatically creates components for inclusion in a creative. The synthesis subsystem includes one or more modules that receive, as input, crawled content or metadata known or identified by the content serving system, and produce, as an output, a synthesized component for inclusion in a prospective creative. The system further includes an evaluation subsystem that evaluates quality of each of the synthesized components generated by the synthesis subsystem to determine measurable quality as against a baseline quality level. The system further includes a serving subsystem that receives queries and selects relevant content items responsive to the queries including, for a given content item, identification of one or more synthesized components generated by the synthesis subsystem depending on the evaluation of the respective synthesized components by the evaluation subsystem.

23 Claims, 4 Drawing Sheets

(56) References Cited

U.S. PATENT DOCUMENTS

2014/0114746 A1* 4/2014 Pani ............... G06Q 10/067
705/14.45

* cited by examiner

AUTOMATIC SYNTHESIS AND EVALUATION OF CONTENT

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content. The content can be provided to a user device such as a personal computer (PC), a smartphone, a laptop computer, a tablet computer, or some other user device. Different types of content, such as advertisements and search results, can be selected for presentation in different ways.

SUMMARY

In general, one innovative aspect of the subject matter described in this specification can be implemented in systems, including a system that includes a synthesis subsystem that automatically creates components for inclusion in a creative. The synthesis subsystem includes one or more modules that receive, as input, crawled content or metadata known or identified by the content serving system, and produce, as an output, a synthesized component for inclusion in a prospective creative. The system further includes an evaluation subsystem that evaluates quality of each of the synthesized components generated by the synthesis subsystem to determine measurable quality as against a baseline quality level. The system further includes a serving subsystem that receives queries and selects relevant content items responsive to the queries including, for a given content item, identification of one or more synthesized components generated by the synthesis subsystem depending on the evaluation of the respective synthesized components by the evaluation subsystem.

These and other implementations can each optionally include one or more of the following features. The system can further include a monitoring subsystem that monitors served content items including evaluating a performance attributable to each synthesized component and provides feedback to the evaluation subsystem so as to ensure that respective components are satisfying the baseline quality level over time. The synthesis subsystem can automatically generate selection criteria for the synthesized component or creative based on an evaluation of the input crawled content or metadata. The synthesis subsystem can include a plurality of modules, each providing one or more synthesized components of a plurality of components that are included in the prospective creative. One of the plurality of modules can receive, as an input, content sponsor parameters defining at least a portion of an existing creative or feature as specified by the content sponsor. The synthesis subsystem can generate or replace an existing creative including providing one or more synthesized components for replacement of a component in the existing creative based at least in part on an output of the evaluation subsystem. The synthesis subsystem can receive as an input a previously synthesized content item including one or more previously generated synthesized components and provide, as an output, a re-synthesized content item including creating one or more new components or replacing one or more components of the previously synthesized content item with one or more new synthesized components based at least in part on a new synthesis and/or a new or existing evaluation by the evaluation subsystem. The evaluation subsystem can use, as a baseline, a performance of an existing creative. The evaluation subsystem can group synthesized components together based on one or more predetermined data facets. For each grouping, the evaluation subsystem can sample the synthesized components in a respective grouping. The evaluation subsystem can evaluate each grouping producing evaluation metrics per sample grouping and determine, based on the evaluating, that all synthesized components belonging to a respective grouping are approved to be served responsive to received requests. The serving subsystem can include or access a storage system that includes synthesized components that the evaluation subsystem has evaluated and approved. The serving subsystem can serve a set of synthesized components forming the prospective creative or use one or more predetermined quality signals to discern which synthesized components are particularly relevant to a received request or user associated therewith. The serving subsystem can evaluate content sponsor components as compared to synthesized components using one or more quality signals to determine which components to serve in a content item responsive to a given request. The monitoring subsystem can identify one or more policies that define when re-evaluation, re-synthesis or disabling should occur and triggers the re-evaluation or re-synthesis or disabling for a given creative. A policy can specify an amount of time since a last evaluation or synthesis or a number of times served. The system can further include a storage subsystem for storing synthesized components and a recommendation subsystem for providing recommendations to content sponsors of synthesized components for generating a creative for a campaign. The evaluation subsystem and the monitoring subsystem can form a closed-loop feedback system for a content sponsor so as to improve performance of a campaign. The system can further include a notification subsystem for notifying a content sponsor of changes based on the closed-loop feedback. The system can further include a content sponsor control subsystem that enables a content sponsor to opt in or out of various system options including options for complete substitution of synthesized components for a given creative, notifications for updates to a given creative, approvals of substitutions of synthesized content or performance updates for creatives that include synthesized components. The evaluation subsystem can receive, as an input from a content sponsor, an evaluation input that is used in approving a synthesized content item. The content items can be advertisements.

In general, another innovative aspect of the subject matter described in this specification can be implemented in methods that include a computer-implemented method for providing content. The method includes mapping content items to metadata, the metadata being crawled content or information about content, including information about content developed based on logged search results and including information about serving one or more content items responsive to requests for content. The method further includes transforming the metadata into features that can be included as a synthesized component in a content item. The method further includes saving the features. The method further includes evaluating the features in groups including grouping components based one or more predetermined data facets, sampling the components in a group, and evaluating performance of the sampled components to determine acceptability of a given group. The method further includes resynthesizing components over time in accordance with predetermined criteria. The method further includes serving relevant content items responsive to received requests including providing one or more synthesized components for inclusion in a creative that is provided responsive to the request.

These and other implementations can each optionally include one or more of the following features. Serving includes providing a notification to users associated with a given request of an origin associated with synthesized components.

In general, another innovative aspect of the subject matter described in this specification can be implemented in computer program products that include a computer program product tangibly embodied in a computer-readable storage device and comprising instructions. The instructions, when executed by one or more processors, cause the processor to: map content items to metadata, the metadata being crawled content or information about content, including information about content developed based on logged search results and including information about serving one or more content items responsive to requests for content; transform the metadata into features that can be included as a synthesized component in a content item; save the features; evaluate the features in groups including: grouping components based one or more predetermined data facets, sampling the components in a group, and evaluating performance of the sampled components to determine acceptability of a given group; resynthesize components over time in accordance with predetermined criteria; and serve relevant content items responsive to received requests including providing one or more synthesized components for inclusion in a creative that is provided responsive to the request.

Particular implementations may realize none, one or more of the following advantages. Parts or all of content items, including advertisement creatives, can be synthesized automatically using existing content and/or associated metadata. Synthesized components can be presented as (or with) content items or provided to content sponsors as suggestions to include in campaigns. Automatic grouping and sampling-based evaluation of the synthesized content can allow synthesis to be performed on a larger scale and at a faster rate.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes systems, methods, computer program products and mechanisms for providing content, including a system having, for example, synthesis, evaluation, serving, and monitoring subsystems that, collectively, automatically create and maintain synthesized content (e.g., advertisements). For example, features (e.g., site links) that are included with content items can be synthesized to create synthesized components. The synthesized components can be evaluated, e.g., with input provided by an evaluator, and the synthesized components can be approved and stored. A serving subsystem can use the stored synthesized components individually or in combination to substitute for, modify or otherwise augment a content item that is provided in response to a received request for content (e.g., queries). Over time, the synthesized components that have been served can be monitored, e.g., for performance, and this can result in re-synthesis and evaluation of the synthesized components.

Figure 1:
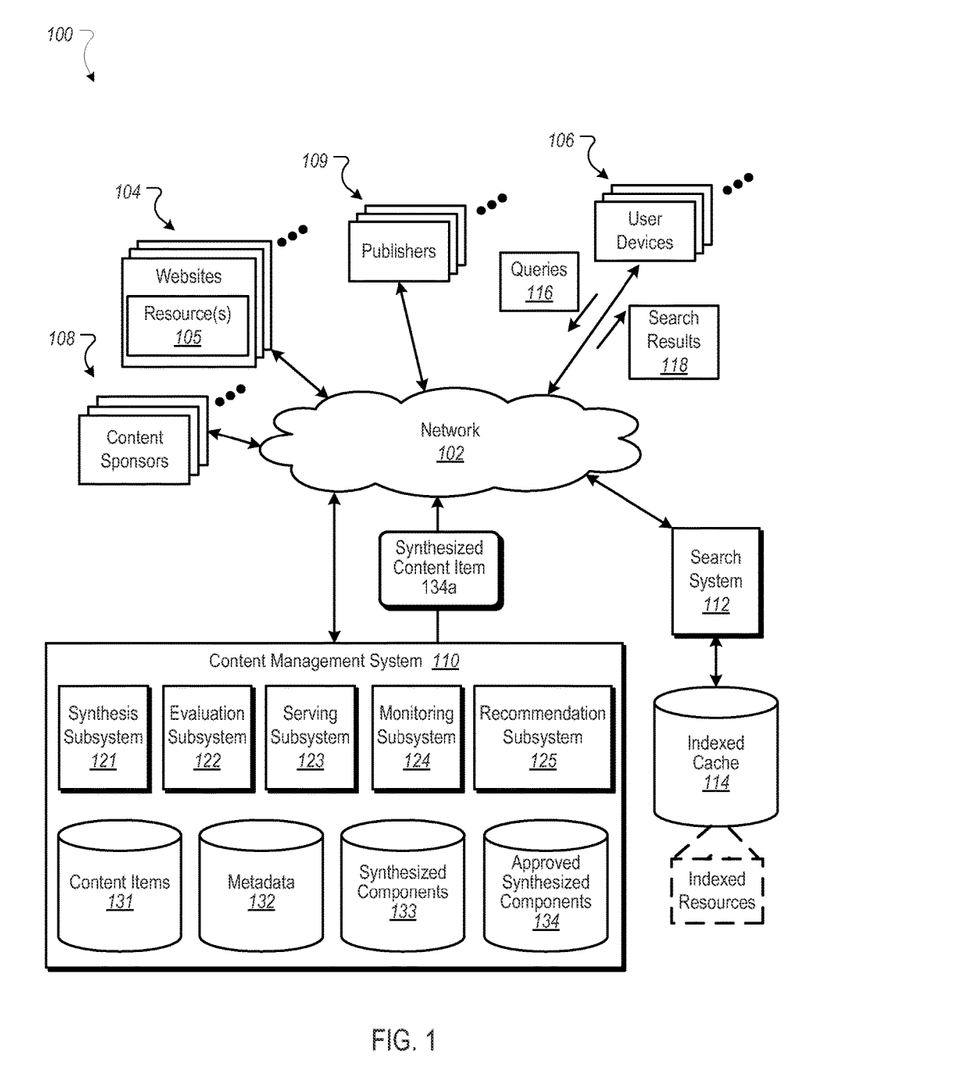
FIG. 1 is a block diagram of an example system for delivering content.

FIG. 1 is a block diagram of an example system 100 for delivering content. The example system 100 includes a content serving system (e.g., the content management system 110) for selecting and providing content in response to requests for content. The example system 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example system 100 may include many thousands of websites 104, user devices 106, content sponsors 108 and publishers 109.

In some implementations, in response to a request for content (e.g., a search query 116), the content management system 110 can provide a synthesized content item 134a. For example, the synthesized content item 134a can be an advertisement that includes a synthesized component that has been created and maintained by the content management system 110 through synthesis, evaluation, serving, and monitoring by its subsystems.

Figure 2:
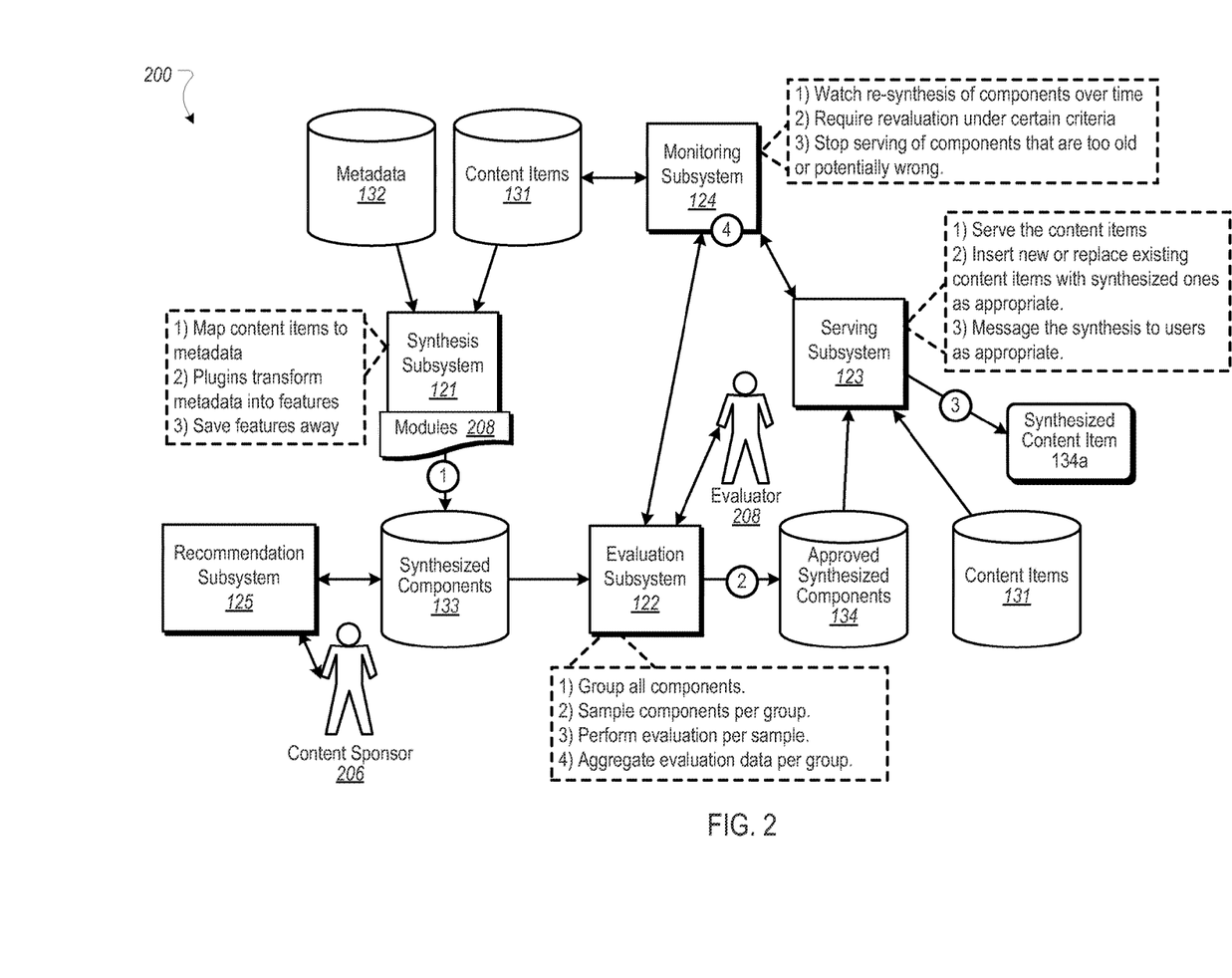
FIG. 2 shows an example system for providing synthesized content.

The content management system 110 can include plural subsystems 121-125, briefly described here and described in more detail with respect to FIG. 2. Although the subsystems 121-125 are shown to be included in the content management system 110, the subsystems 121-125 can reside, each in whole or in part, at different physical locations and coupled to the content management system 110 and other systems using the network 102.

A synthesis subsystem 121, for example, can automatically create components, for inclusion in a creative. In some implementations, the synthesized components can be stored in a data store of synthesized components 133.

An evaluation subsystem 122, for example, can evaluate the quality of each of the synthesized components generated by the synthesis subsystem 121 to determine measurable quality as against a baseline quality level. In some implementations, the evaluated synthesized components can be stored in a data store of approved synthesized components 134.

A serving subsystem 123, for example, can receive queries or other requests for content and select relevant content items responsive to the queries. For a given content item, the serving subsystem 123 can identify one or more synthesized components generated by the synthesis subsystem 121 from the approved synthesized components 134.

In some implementations, the system 100 can include a monitoring subsystem 124, e.g., that can monitor served content items to evaluate performance attributable to each synthesized component as it is presented/interacted with over time (e.g., provided in response to requests for content). The monitoring subsystem 124 can provide feedback to the evaluation subsystem 122 so as to ensure that respective synthesized components are satisfying a baseline quality level over time. The monitoring subsystem 124 can also be responsible for detecting abnormalities by comparing snapshots of synthesized components over time and comparing previously-approved synthesized components with newly-proposed synthesized components. For example, the monitoring subsystem 124 can detect and predict substantial changes in performance, such as large drops or increases in user interactions.

In some implementations, the system 100 can include a recommendation subsystem 125. For example, the recommendation subsystem 125 can be used for providing recommendations to content sponsors 108 of synthesized components for generating a creative for a campaign.

In some implementations, the system 100 can include other subsystems. For example, a storage subsystem (not shown) can be used for storing synthesized components and approved synthesized components. A content sponsor control subsystem (not shown), for example, can enable a content sponsor to opt in or out of various system options, including options for complete substitution of synthesized components for a given creative, notifications for updates to a given creative, approvals of substitutions of synthesized content or performance updates for a creative that includes synthesized components. A notification subsystem (not shown), for example, can be used in notifying a content sponsor of changes based on a closed-loop feedback cycle that includes synthesis, evaluation, serving and monitoring. In some implementations, generation of creatives (e.g., and other aspects described herein) can occur for creatives that are not associated with a specific campaign.

The system 100 can include plural data stores 131-134, which can be stored locally by the content management system 110 or stored somewhere else and accessible using the network 102. In some implementations, the data stores 131-134 can be generated as needed from various data sources. A data store of content items 131, for example, can include content items (e.g., advertisement components and other content, including web content) that the synthesis subsystem 121 can use to create the synthesized components 133. Metadata 132, for example, can include crawled content or information about content that is developed based on serving one or more content items responsive to requests for content. The information can also include information about logged historical search results that have been co-displayed with respective content. The synthesized components 133, for example, can include components synthesized by the synthesis subsystem 121. The approved synthesized components 134, for example, can include synthesized components that have been evaluated and/or approved by the evaluation subsystem 122.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the system 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a webpage title, a snippet of text or a portion of an image extracted from the webpage, and the URL of the webpage. Search results pages can also include one or more slots in which other content items (e.g., ads) can be presented. In some implementations, slots on search results pages or other webpages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals. Eligible content items that can be selected for the response to the request can include the content items 131 in combination with the approved synthesized components 134.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection or other interaction with) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a website or webpage, registering on a website, experiencing media, or performing a social action regarding a content item (e.g., an ad), such as republishing or sharing the content item. Other actions that constitute a conversion can also be used.

In some implementations, conversions may be more likely to occur when a user is presented with a content item that includes synthesized content. For example, the user may be more likely to interact with an advertisement if the advertisement has been altered to include content from crawled content and/or metadata that has been evaluated and determined to have a quality indicative of performing well if provided to a user.

For situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

FIG. 2 shows an example system 200 for providing synthesized content. The system 200 can include, for example, the subsystems 121-125, each of which can be associated with one or more of example stages 1-4 for creating and providing synthesized components.

At stage 1, for example, the synthesis subsystem 121 can automatically create synthesized components, such as features of advertisements, for inclusion in a creative. The synthesis subsystem 121 can include one or more modules that have different purposes. A content receiving module, for example, can receive, as input, crawled content (e.g., from content items 131) or metadata 132 known or identified by the content management system 110. A content producing module, for example, can produce, as an output, a synthesized component for inclusion in a prospective creative. The synthesized components created by the synthesis subsystem 121 can be stored in a data store of synthesized components 133. In general, a synthesized component is one that is derived from other content. That is, a synthesized component includes content derived from another source. To obtain such content, the synthesis subsystem can include crawlers or other tools for extracting features from crawled content. Examples of features are described in greater detail below.

As an example, different types of modules (e.g., plug-ins) can exist for different types of data sources (e.g., various types of content or metadata) and the feature(s) that are created from those data sources. Each module, for example, can specify or be associated with a specific type of input (e.g., metadata) to be used as input and the type(s) of feature(s) that are to be synthesized. The synthesis subsystem 121, for example, can automatically locate instances of that type of input for each module. One example of a module can extract product ratings from a parsed and/or crawled landing page of a content item (e.g., advertisement). The module can create a star rating content item feature from the extracted content. In another example, a different module can analyze historical search results associated with a content item's (e.g., advertisement's) domain and create site links from those results. In yet another example, a module can create a synthesized component for a location extension, such as a phone number, address, map or other specific location-related information associated with a physical location of an entity.

In some implementations, modules can use machine learning techniques to generate the synthesized components. For example, information provided by the evaluation subsystem 122 can be used to make adjustments in and improve the performance of the synthesis process. In some implementations, modules can use information associated with performance metrics (e.g., click-throughs, conversions, and other user interactions) to make decisions about how synthesized components are to be created.

In some implementations, the synthesis subsystem 121 can automatically generate selection criteria for the synthesized component or creative based on an evaluation of the input crawled content or metadata. For example, the synthesis subsystem 121, including its modules, can automatically generate keywords and other selection criteria (e.g., including language=Spanish, country=US, etc.) that are associated with the synthesized features. In another example, when a landing page associated with an advertisement is mostly in Spanish and the advertisement is related to automobiles, then the synthesis subsystem 121 can generate selection criteria (e.g., keywords) corresponding to Spanish language content related to automobiles. In yet another example, the synthesis subsystem modules can generate multiple features from the same source, such as English site links for English language queries and French site links for French language queries, e.g., that can be derived from a translation of the content sponsor-provided English site links.

In some implementations, the synthesis subsystem 121 can include a plurality of modules, each providing one or more synthesized components of a plurality of components that are included in the prospective creative. For example, separate modules can exist for different feature types (e.g., one for site links, and one for location extensions). In some implementations, one of the plurality of modules can receive, as an input, content sponsor parameters defining at least a portion of an existing creative or feature as specified by the content sponsor. Input parameters can include, for example, advertisement creative/features that have already been specified by the content sponsor. For example, when the content sponsor has already specified to include English site links for a given advertisement, then a module can create French site links for the same advertisement.

In some implementations, the synthesis subsystem 121 can generate or replace an existing creative, including providing one or more synthesized components for replacement of a single or all of the components in the existing creative based at least in part on an output of the evaluation subsystem 122. For example, the synthesis subsystem 121 can generate any number of features that are required for a given creative.

In some implementations, the synthesis subsystem 121 can receive, as an input, a previously synthesized content item including one or more previously generated synthesized components. The synthesis subsystem 121 can provide, as an output, a re-synthesized content item, including creating one or more new components or replacing one or more components of the previously synthesized content item with one or more new synthesized components based at least in part on a new synthesis and/or a new or existing evaluation by the evaluation subsystem. For example, as part of the monitoring process, it may be determined that the performance of a synthesized content item is less than desired. A decision can be made, for example, to change how one or more features are synthesized. As such, the synthesis subsystem 121 can be used to re-synthesize the content item. In some implementations, previously-synthesized components can be used to generate additional new content items that complement instead of replace existing components. For example, English site links can be generated using the historical search results module, and a site link translator module can use those synthesized components to make French or other site links.

At stage 2, for example, the evaluation subsystem 122 can evaluate the quality of each of the synthesized components generated by the synthesis subsystem 121 to determine measurable quality as against a baseline quality level. In some implementations, the evaluated synthesized components can be stored in a data store of approved synthesized components 134.

In some implementations, the evaluation subsystem 122 can use, as a baseline, a performance of an existing creative. For example, the evaluation subsystem 122 can compare the performance of a content item with the performance of the content item modified to include synthesized features. In this example, the performance of the content item alone can be the baseline performance by which the performance is measured for the same content item updated with synthesized features.

In some implementations, the evaluation subsystem 122 can use group-based evaluations. For example, the evaluation subsystem 122 can group synthesized components together into groups based on one or more predetermined data facets. One example grouping is by component type, language, country, and content sponsor (e.g., advertiser). For each grouping, the evaluation subsystem 122 can sample the synthesized components in the respective grouping and evaluate the sample to produce evaluation metrics for that grouping. For example, the evaluation subsystem 122 can select and evaluate a small percentage of features from the [site links, English, US, Sample Company] grouping. Based on the evaluation, the evaluation subsystem 122 can determine, for example, that all synthesized components belonging to a respective grouping are approved or disapproved (e.g., eligible or ineligible) to be served responsive to received requests. Evaluating can be based solely on user input, or evaluating can use machine learning techniques that may or may not include additional inputs from a human, such as an evaluator 208.

In some implementations, for each grouping, a sample of the components can be collected for the evaluation. For example, samples can be drawn using various methods that include uniform random, impression-weighted random, revenue-weighted random, top N by impressions, top N by revenue, or other sample groupings. For example, a sample taken from a group of a million components in the group [site links, English, US, Sample Company] can include 100 content items having the highest numbers of impressions.

In some implementations, the evaluation subsystem 122 can receive, as an input from a content sponsor, an evaluation input that is used in approving a synthesized content item. For example, the evaluator 208 can evaluate a synthesized component and provide input as to whether the synthesized component is acceptable or unacceptable. Also, the evaluation can include various facets, e.g., whether the synthesized component is useful, relevant, family-safe, or other types of facets.

In some implementations, the evaluation stage can be skipped. For example, for some content sponsors or campaigns, or for some types of synthesis, e.g., when certain modules are used that have a high reliability of producing high-quality synthesized components. When the evaluation stage is skipped, for example, the synthesized components can be considered to be approved at creation.

In some implementations, as a result of the evaluation, components in a creative can be replaced. For example, the evaluation subsystem 122 can determine that a synthesized component is to automatically replace an existing component in the creative, or the evaluator 208 can make the decision on a case-by-case basis.

At stage 3, for example, the serving subsystem 123 can receive queries (e.g., or other requests for content) and select relevant content items responsive to the queries. For a given content item, the serving subsystem 123 can identify one or more content items 131 that are responsive to the queries. The serving subsystem 123 can also identify associated approved synthesized components 134 to combine with the content items 131.

In some implementations, the serving subsystem 123 can serve a set of synthesized components forming the prospective creative or can use one or more predetermined quality signals to discern which synthesized components are particularly relevant to a received request or user associated therewith. For example, in response to a query, the serving subsystem 123 can use online quality signals to determine whether to serve none, some, or all of the approved synthesized components 134 associated with the content item 131. The determination can include determining which components are relevant to the query or user associated with the query.

In some implementations, the serving subsystem 123 can evaluate content sponsor components as compared to synthesized components using one or more quality signals to determine which components are to be served in a content item responsive to a given request. As an example, when there are content sponsor-specified components of a content item that compete with synthesized components (e.g., both are site links), the serving subsystem 123 can use online quality signals to determine whether to serve the sponsor-specified components, the synthesized components, or some combination thereof.

In some implementations, the serving subsystem 123 can include or access a storage system that includes synthesized components that the evaluation subsystem has evaluated and approved. For example, the content items 131 and approved synthesized components 134 can be stored in a storage system used by the serving subsystem 123 to respond to received queries.

At stage 4, for example, the monitoring subsystem 124 can monitor served content items, e.g., to evaluate performance attributable to each synthesized component as it is used over time (e.g., provided in response to requests for content). Over time, the monitoring subsystem 124 can provide feedback to the evaluation subsystem 122 so as to ensure that respective components are satisfying the baseline quality level.

In some implementations, the monitoring subsystem 124 can identify one or more policies that define when re-evaluation, re-synthesis or disabling should occur, and the monitoring subsystem 124 can trigger the re-evaluation or re-synthesis for a given creative. For example, policies can be established and used in which an already approved or rejected synthesized grouping should be re-evaluated using the evaluation subsystem 122. In some implementations, at least one policy can specify an amount of time since a last evaluation or synthesis, or a number of times that the synthesized component has been served. For example, one policy can state that a grouping (e.g., component type, language, country, and content sponsor) be re-evaluated once each year or some other time, or be re-evaluated after the synthesized component has been served (e.g., included with content items) 1000 times.

In some implementations, other policies can exist. For example, another policy can be established to re-evaluate a grouping when important differences in the data are detected, e.g., in a re-synthesis. Every time a re-synthesis occurs, for example, an automatic comparison can be made between information in the present synthesis with the previous one. For example, if more than N % of the data has changed, a re-evaluation can be forced. Other policies, e.g., used by the serving subsystem 123, can prohibit serving of components older than N days. Further, the staleness information (e.g., based on the age of the synthesized component) can be communicated to the serving subsystem 123 as part of the quality signals. Other policies can include policies that are based, for example, on significant increases or decreases in coverage (e.g., as defined as the fraction of content items having synthesized components of a specific grouping) or weighted coverage (e.g., as defined as the fraction of content items weighted by revenue, impressions, clicks, etc., and having synthesized components of a specific grouping). In some implementations, this policy can be faster at detecting situations in which a website's structure changes and previously applicable synthesis algorithms stop working or erroneously capture too much of the crawled content. In some implementations, the monitoring subsystem 124 can compare information for newly-proposed synthesized components with previously identified (and approved) synthesized components or other components associated with a respective content item.

In some implementations, the evaluation subsystem 122 and the monitoring subsystem 124 can form a closed-loop feedback system for a content sponsor 108 so as to improve performance of a campaign. For example, a full cycle of synthesis, evaluation, serving, and monitoring can help to ensure that each of the stages in the cycle are contributing to providing high-quality synthesized components with served content items.

In some implementations, other stages can be used in the system 200. Another stage can include, for example, the use of a notification subsystem for notifying a content sponsor of changes based on the closed-loop feedback. For example, if a different version of a synthesized component is used with the content sponsor's campaign, then the content sponsor can be notified. Another stage can include, for example, the use of the recommendation subsystem 125, e.g., in which components that are synthesized or re-synthesized can be presented to a content sponsor as a suggestion. The recommendation subsystem 125 can be used, for example, instead of having the synthesized components being served automatically by the serving subsystem 123.

Figure 3:
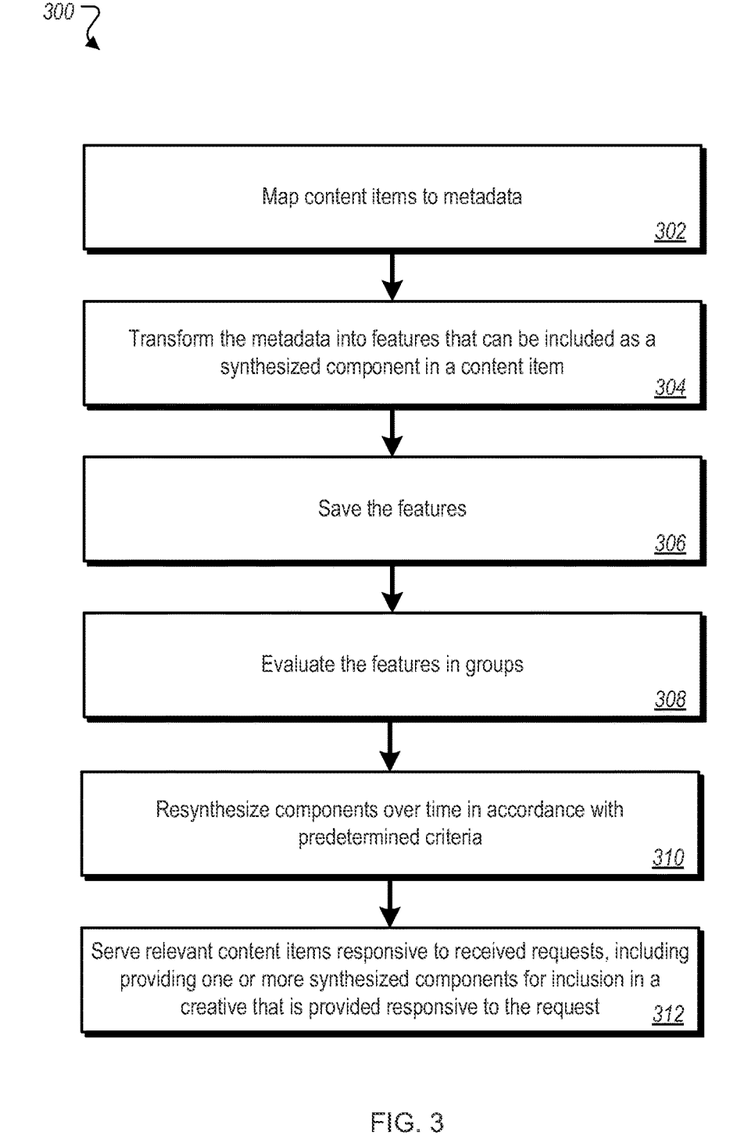
FIG. 3 is a flowchart of an example process for providing synthesized content.

FIG. 3 is a flowchart of an example process 300 for providing synthesized content. In some implementations, the content management system 110 and its subsystems 121-124 can perform stages of the process 300 using instructions that are executed by one or more processors. FIGS. 1-2 are used to provide example structures for performing the stages of the process 300.

Content items are mapped to metadata (302). The metadata can be crawled content or information about content, including information about content that is developed based on logged search results and including information about serving one or more content items responsive to requests for content. For example, the synthesis subsystem 121 can crawl content, including content items such as advertisements, available in content items 131 or other sources. The synthesis subsystem 121 can map the content items to metadata 132. Mapping information can identify, for example, specific types, sources and/or locations of content that is to be used for different types of synthesis. For a given content item, for example, the mapping information can identify sources (e.g., URLs) of resources that can be crawled to extract synthesized components. For example, to create a synthesized component for an advertisement about a car, the basis for synthesized content can be a car manufacturer's website, a car reviewer (e.g., a car/driver review website), or some other car-related resource. In this example, the advertisement for the car that is ultimately served can include a synthesized component of a recent review, a recent rating, or other sponsor or third-party data. In another example, mapping information that is used for developing a synthesized component including location extensions for Example XYZ Products can identify a landing page (or a specific tab) for Example XYZ Products as a source for address, phone or other location information needed for synthesis.

In an example involving site links, there can be several sources that can be crawled or otherwise analyzed that include site links related to a content item (e.g., an advertisement for Example XYZ coffeemakers). The resources can include, for example, websites that are related to coffeemakers, websites associated with the Example XYZ company, websites associated with a particular model of Example XYZ coffeemakers, and other related websites and/or content items, including advertisements. Each of the resources can contain content, for example, that includes links to various websites associated with Example XYZ coffeemakers and/or websites associated with the purchase or repair of coffeemakers. Site links can also be obtained, for example, from the URLs of these websites. Each of these site links can be extracted during synthesis, e.g., from the entire corpus of metadata related to the Example XYZ coffeemakers advertisement.

Identifying the specific metadata to be used for the purpose of synthesizing content can be done in different ways. For example, for content items related to Example XYZ coffeemakers, the metadata can include landing pages and other pages for resources that are related to Product XYZ reviews/products, coffeemakers in general, kitchen appliances, or other related resources. In some implementations, content sponsors can be provided with an interface for identifying specific or general resources as candidates for finding and extracting relevant synthesized components.

The metadata is transformed into features that can be included as a synthesized component in a content item (304). As an example, the synthesis subsystem 121 can create synthesized components 133 that are based on the metadata 132. For example, for review information (e.g., coffeemakers) based on star ratings, the synthesis subsystem 121 can extract star rating information from third-party content (e.g., reviews of coffeemakers). A module can, for example, access websites related to best coffeemakers and crawl content to find rating related information, e.g., specifically related to the Example ABC Coffeemaker company. For example, the module can look for an image including a number of rating stars, specific text (e.g., best/better/worst, reliability, ease-of-use, customer service, etc.), specific coffeemaker-related terms (e.g., programmable, automatic, etc.), and/or numeric values (e.g., 90% satisfaction rating). The result of the synthesis, for example, can be a feature that includes a star rating, a numeric score, or some other feature that can be included in a synthesized component and inserted into an advertisement for Example ABC coffeemakers.

When metadata related to Example ABC coffeemakers site links is transformed into features, the synthesis can end up with several different site links synthesized from several different sources. For example, the synthesis subsystem 121 can create features based on an analysis of search results that have been logged as co-occurring with the advertisements from Example XYZ coffeemakers. The site links, for example, can be created using information about search results that have a significant number of user clicks, are from the same domain as the content sponsor, and/or occur on the same or other page associated with the content sponsor.

The features are saved (306). For example, the features can be stored with the synthesized components 133 or in another data store. The feature for the coffeemaker, for example, can be stored and identified by component type (or data facet), language, country, and content sponsor, e.g., [product rating, English, US, Example ABC Coffeemaker]. Depending on the languages and countries for which features are generated, for example, there can be multiple features stored each time a specific module is used (e.g., for multiple languages and countries). In some implementations, selection criteria associated with the features can also be saved, e.g., in the synthesized components 133, such as when the features are stored or when selection criteria are determined.

The features are evaluated in groups (308), including one or more of the following. In some implementations, components are grouped based one or more predetermined data facets such as a common characteristic or type of feature (e.g., all site link features are grouped together or all location extensions are grouped together). Other ways to group features include language, country or content sponsor. In some implementations, features can also be grouped by landing page URL or other types of URLs. The components are sampled in a group. Performance of the sampled components is evaluated (e.g., by the evaluation subsystem 122) to determine acceptability of a given group. The information can include, for example, information about click-through rates, conversions or other user interactions that can indicate the quality of the components. The information can also include information about the results of human review of the evaluated features. In some implementations, other ways of sampling and/or grouping the features can be used, e.g., to obtain more specific evaluation information on smaller groups, or to evaluate features that were made using a specific module (e.g., to improve the module).

In the example involving site links associated with Example XYZ coffeemakers, the evaluation subsystem 122 can evaluate the synthesized components to determine which of the synthesized site links are best to be used, e.g., when included with a content item. For example, a site link associated with a website or store that sells Example XYZ coffeemakers can be determined, during the evaluation, to be better than site links that may be associated with a small amount of product information and no ability to buy an actual product. As a result of the evaluation, for example, the best synthesized components associated with Example XYZ coffeemakers can be stored in the approved synthesized components 134.

Components are resynthesized over time in accordance with predetermined criteria (310). For example, using information provided by the monitoring subsystem 124, the evaluation subsystem 122 can re-synthesize existing approved synthesized components 134 on an on-going basis. Synthesized components related to the Example ABC coffeemaker, for example, can be resynthesized if monitoring determines poor performance (e.g., user interactions including click-throughs, conversions, etc.) of Example ABC coffeemaker advertisements that include synthesized components, or if the information included in the synthesized components is outdated.

Relevant content items are served responsive to received requests (312). The serving includes providing one or more synthesized components for inclusion in a creative that is provided responsive to the request. As an example, the received request can be the search query 116 received by the content management system 110 from the user device 106. If the search query is related, for example, to Example ABC coffeemakers (e.g., based on query terms or phrases), then an Example ABC coffeemaker advertisement that is selected can include synthesized component related to product ratings.

In some implementations, serving the relevant content items can include providing a notification to users associated with a given request of an origin associated with synthesized components. For example, content items (e.g., advertisements) that are served to users can include a message or other indication that identifies and indicates the source of any synthesized content. The information can include, for example, which data was generated automatically (e.g., "the site links"), the inputs from which it was generated (e.g., "crawled pages" or "historic search results"), and how old the data is (e.g., "from last week"). In some implementations, users can provide settings or preferences that indicate whether or not synthesized content is to be received and/or what user information is allowed to be used to select synthesized content.

Figure 4:
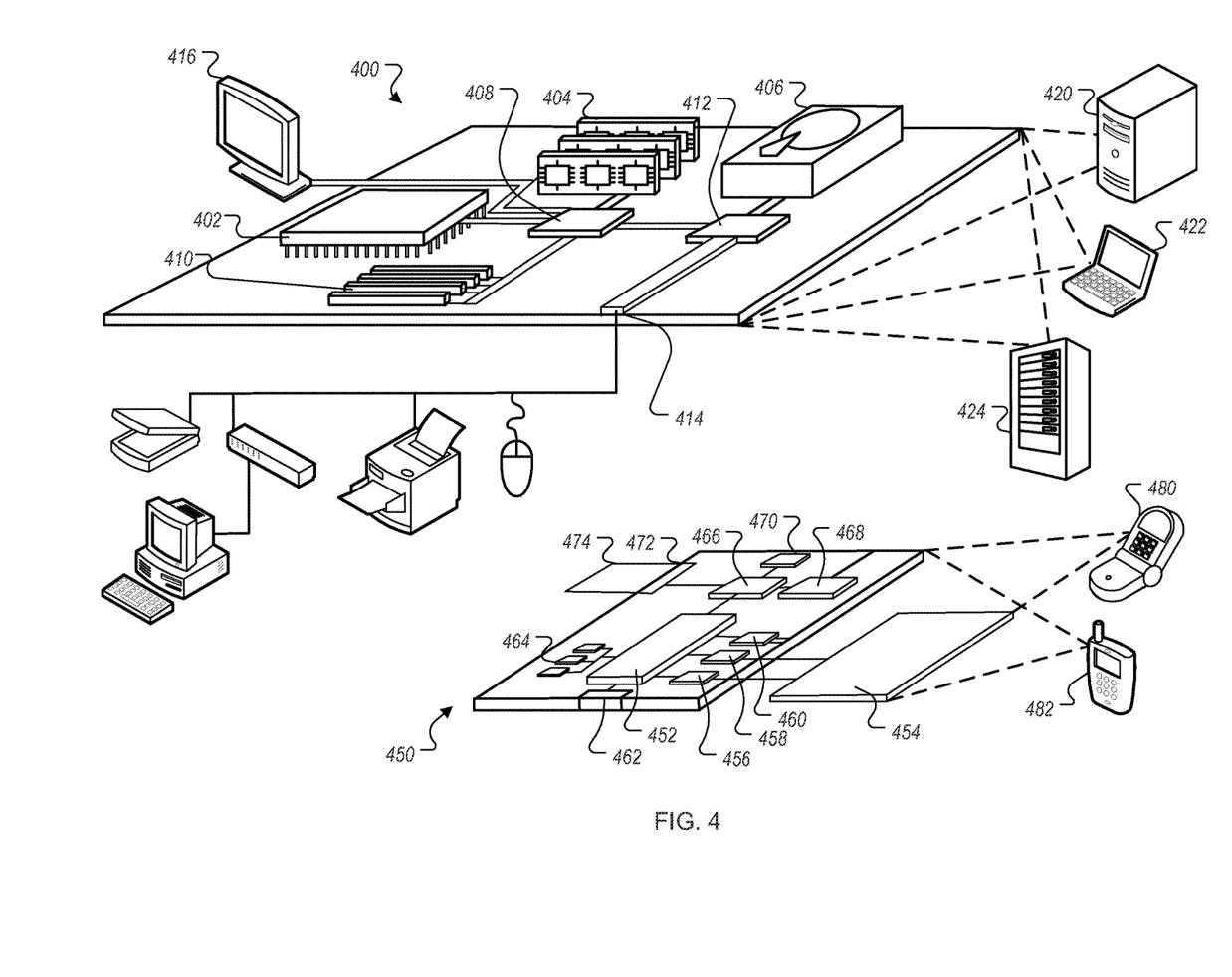
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A content serving system including:
    a synthesis subsystem that automatically creates components for inclusion in a creative, the synthesis subsystem including one or more modules that perform operations including:
        receiving, as input, crawled metadata known to or identified by the content serving system, wherein the metadata is mapped to a given content item that links to a given page of a web site and that is provided by a given content provider;
        identifying, from the metadata, logged search results that each link to a page of the website and that were each presented on a search results page along with a content item distributed by the content serving system for presentation with the logged search results that were provided by a search system; and
        transforming the logged search results into two or more sitelinks that directly link to different sub-pages of the site;
    an evaluation subsystem that performs operations including evaluating quality of a modified version of the given content item that includes at least some of the sitelinks to determine measurable quality as against a baseline quality level of the given content item prior to modification, wherein the evaluation includes comparing performance of the modified version of the given content item to the performance of the given content item prior to modification; and
    a serving subsystem that performs operations including receiving queries, selecting the given content item as a relevant content item responsive to the queries, selecting at least two of the sitelinks to include in the given content item based on the evaluating, modifying the given content item to create a modified version of the given content item that includes the at least two sitelinks, and outputting the modified version of the given content item that includes the at least two of the sitelinks.

2. The content serving system of claim 1 further including a monitoring subsystem that performs operations including:
    monitoring served content items including evaluating a performance attributable to the modified version of the given content item; and
    providing feedback to the evaluation subsystem so as to ensure that the modified version of the given content item is satisfying the baseline quality level over time.

3. The content serving system of claim 1 wherein the operations of the synthesis subsystem further include automatically generating selection criteria for the modified version of the given content item based on an evaluation of the input crawled metadata, and wherein the selection criteria include keywords, a country and a language for identifying eligible content in response to a request for content.

4. The content serving system of claim 1 wherein the synthesis subsystem includes a plurality of modules, each providing a modified version of the given content item to be included in the creative.

5. The content serving system of claim 4 wherein one of the plurality of modules receives, as an input, content sponsor parameters defining at least a portion of an existing creative or feature as specified by a content sponsor.

6. The content serving system of claim 1 wherein the operations performed by the serving subsystem further include generating or replacing an existing creative including providing the modified version of the given content item in place of the existing creative based at least in part on an output of the evaluation subsystem.

7. The content serving system of claim 1 wherein the operations performed by the synthesis subsystem further include receiving, as an input, a previously synthesized content item including the modified version of the given content item and providing, as an output, a re-modified version of the given content item including creating one or more new components or replacing one or more components of the modified version of the given content item with one or more components based at least in part on a new synthesis and/or a new or existing evaluation by the evaluation subsystem.

8. The content serving system of claim 1 wherein the evaluation subsystem uses, as a baseline, a performance of an existing creative.

9. The content serving system of claim 1 wherein the operations performed by the evaluation subsystem further include:
grouping modified versions of the given content item together based on one or more predetermined data facets;
for each grouping, sampling the modified versions of the given content item in a respective grouping;
evaluating each grouping producing evaluation metrics per sample grouping; and
determining, based on the evaluating, that all modified versions of the given content item belonging to a respective grouping are approved to be served responsive to received requests.

10. The content serving system of claim 1 wherein the serving subsystem includes or accesses a storage system that includes the modified version of the given content item.

11. The content serving system of claim 1 wherein the operations performed by the serving subsystem further include serving a set of the modified version of the given content item forming the creative or uses one or more predetermined quality signals to discern which the modified version of the given content item are particularly relevant to a received request or user associated therewith.

12. The content serving system of claim 1 wherein the operations performed by the serving subsystem further include evaluating content sponsor components as compared to the modified version of the given content item using one or more quality signals to determine which components to serve in a content item responsive to a given request.

13. The content serving system of claim 2 wherein the operations performed by the monitoring subsystem further include identifying one or more policies that define when re-evaluation, re-synthesis or disabling should occur and triggering the re-evaluation or re-synthesis or disabling for a given creative.

14. The content serving system of claim 13 wherein a policy specifies an amount of time since a last evaluation or synthesis or a number of times served.

15. The content serving system of claim 1 further comprising:
a storage subsystem for storing the modified version of the given content item; and
a recommendation subsystem for providing recommendations to content sponsors of the modified version of the given content item for generating a creative for a campaign.

16. The content serving system of claim 2 wherein the evaluation subsystem and the monitoring subsystem form a closed-loop feedback system for a content sponsor so as to improve performance of a campaign.

17. The content serving system of claim 16 further comprising a notification subsystem for notifying the content sponsor of changes based on the closed-loop feedback system.

18. The content serving system of claim 1 further comprising a content sponsor control subsystem that enables a content sponsor to opt in or out of various system options including options for complete substitution of the modified version of the given content item for a given creative, notifications for updates to a given creative, approvals of substitutions of synthesized content or performance updates for creatives that include the modified version of the given content item.

19. The content serving system of claim 1 wherein the operations performed by the evaluation subsystem further include receiving, as an input from a content sponsor, an evaluation input that is used in approving the modified version of the given content item.

20. The content serving system of claim 1 wherein the content items are advertisements.

21. A computer-implemented method comprising:
mapping content items to metadata, the metadata being crawled content or information about content, wherein the metadata is mapped to a given content item that links to a given page of a web site and that is provided by a given content provider;
identifying, from the metadata, logged search results that each link to a page of the website and that were each presented on a search results page along with a content item distributed by the content serving system for presentation with the logged search results that were provided by a search system;
transforming the logged search results into two or more sitelinks that directly link to different sub-pages of the site;
evaluating a modified version of the given content item in groups including:
evaluating quality of the modified version of the given content item that includes at least some of the sitelinks to determine measurable quality as against a baseline quality level of the given content item prior to modification, wherein the evaluation includes comparing performance of the modified version of the given content item to the performance of the given content item prior to modification;
grouping modified versions of the given content item together based on one or more predetermined data facets;
sampling the modified versions of the given content item in a group; and
evaluating performance of the sampled modified versions of the given content item to determine acceptability of a given group;
resynthesizing the modified version of the given content item over time in accordance with predetermined criteria; and
serving relevant content items responsive to received requests including selecting at least two of the sitelinks to include in the given content item based on the evaluating and providing the modified version of the given content item for inclusion in a creative that is provided responsive to a given request, wherein the at least two sitelinks are included in at least some of the relevant content items.

22. The method of claim 21 wherein serving includes providing a notification to users associated with the given request of an origin associated with the modified version of the given content item.

23. A computer program product embodied in a non-transitive computer-readable medium including instructions, that when executed, cause one or more processors to perform operations including:
mapping content items to metadata, the metadata being crawled content or information about content, wherein the metadata is mapped to a given content item that links to a given page of a web site and that is provided by a given content provider;
identifying, from the metadata, logged search results that each link to a page of the website and that were each presented on a search results page along with a content item distributed by the content serving system for presentation with the logged search results that were provided by a search system;

transforming the logged search results into two or more sitelinks that directly link to different sub-pages of the site;

evaluating a modified version of the given content item in groups including:
- evaluating quality of the modified version of the given content item that includes at least some of the sitelinks to determine measurable quality as against a baseline quality level of the given content item prior to modification, wherein the evaluation includes comparing performance of the modified version of the given content item to the performance of the given content item prior to modification;
- grouping modified versions of the given content item together based on one or more predetermined data facets;
- sampling the modified versions of the given content item in a group; and
- evaluating performance of the sampled modified versions of the given content item to determine acceptability of a given group;

resynthesizing the modified version of the given content item over time in accordance with predetermined criteria; and serving relevant content items responsive to received requests including selecting at least two of the sitelinks to include in the given content item based on the evaluating and providing the modified version of the given content item for inclusion in a creative that is provided responsive to a given request, wherein the at least two sitelinks are included in at least some of the relevant content items.

* * * * *